Jan. 27, 1970     P. F. DONLEY     3,492,008

SHAFT-SEALING SYSTEM

Filed Feb. 5, 1968

PHILIP F. DONLEY, INVENTOR

BY Bosworth, Sessions,
Herrstrom & Cain

ATTORNEYS.

United States Patent Office 3,492,008
Patented Jan. 27, 1970

3,492,008
SHAFT-SEALING SYSTEM
Philip F. Donley, Shaker Heights, Ohio, assignor, by mesne assignments, to Ernest F. Donley's Sons, Inc., Valley View, Ohio, a corporation of Ohio
Continuation-in-part of application Ser. No. 316,617, Oct. 16, 1963. This application Feb. 5, 1968, Ser. No. 703,044
Int. Cl. F16j 15/36, 15/34
U.S. Cl. 277—83    5 Claims

ABSTRACT OF THE DISCLOSURE

An improved shaft sealing system for a machine such as a pump of the impeller type in which (1) the shaft is encompassed at its opposite ends by stationary and rotatable end members; (2) the shaft is surrounded in the space between such members by a sealing unit of the "floating" type; (3) that portion of the sealing unit which faces the stationary end member bears against a stationary seating element; (4) that portion of the sealing unit which faces the rotatable end member bears against a rotatable seating element; and (5) said rotatable seating element is carried by the adjacent end of a two-piece member of generally toroidal shape that bears against the rotatable end member in two radially spaced zones.

BACKGROUND, RELATED APPLICATIONS, PATENTS, ETC.

This application is a continuation-in-part of United States application Ser. No. 316,617 (now Patent No. 3,391,941), filed Oct. 16, 1963, for Shaft-Sealing System, and United States application Ser. No. 621,649, filed Mar. 8, 1967 for "Shaft-Sealing System." The several United States patents cited as references in said applications are representative of the prior art, particularly Wishart Patent 1,759,029, Thompson Patent 1,820,100 and Thomas Patent 3,079,605.

DRAWINGS

The invention is illustrated by way of example in the accompanying drawings, wherein.

PREFERRED EMBODIMENT

Figure 1:
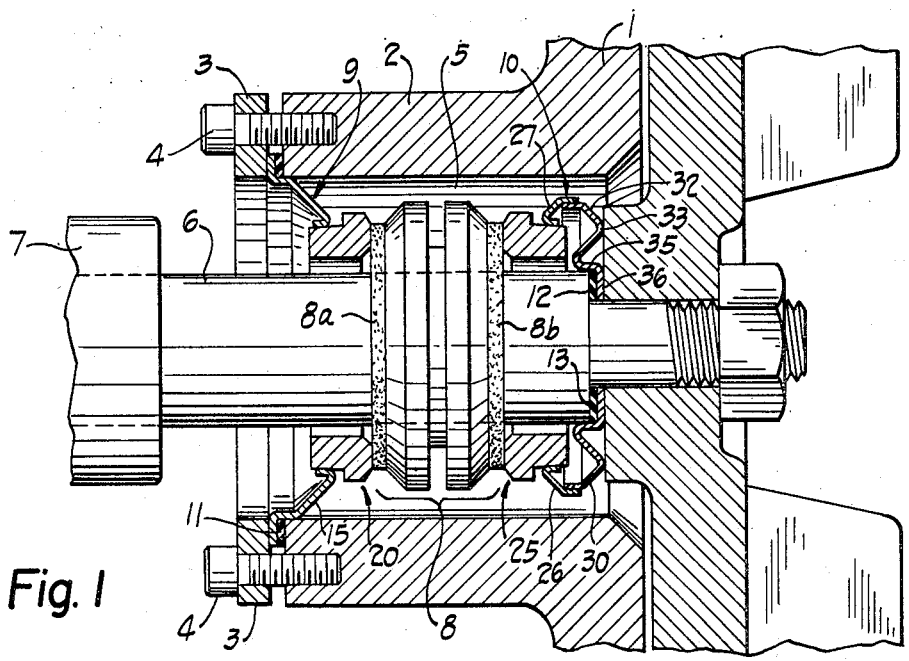
FIGURE 1 is a fragmentary section with parts in elevation through a pump of the impeller type in which the improved sealing system of the present invention is incorporated.

Although the principal objects of the invention are essentially the same as those set forth in prior applications Ser. Nos. 316,617 and 621,649, the preferred embodiment of the invention differs from that of such prior applications in the respects hereinafter indicated and emphasized. As before, pump housing 1, extension 2, stationary end member 3, bolts 4, chamber 5, shaft 6 and coupling 7 are conventional.

In chamber 5, between the opposed faces of the stationary end member and the impeller hub, is the sealing system of the instant invention. It incorporates as a part thereof a "floating" sealing unit 8 of the type disclosed in United States Patent 3,028,163 to Heinrich. Seen as in FIGURE 1, sealing unit 8 is flanked by two sub-assemblies 9 and 10, the former being stationary and bearing against sealing ring 8a and the latter being rotatable with shaft 6 and bearing against sealing ring 8b.

When sub-assembly 9 is readied for installation in the pump, it is first equipped with a snugly fitting gasket 11 that is designed to engage a portion of sub-assembly 9 that is intended to be clamped in position by stationary end member 3. On the opposite side of the sealing system, where rotatable sub-assembly 10 intervenes between sealing unit 8 and the impeller hub, a generally similar gasket 12 is interposed between shoulder 13 on shaft 6 and the portions of the sub-assembly remote from sealing unit 8. Both gaskets are resilient and to that end may be of leather, rubber, a suitable synthetic resin or the like.

A stepped and tapered carrier 15 of annular shape constitutes the outermost component of stationary sub-assembly 9. Preferably formed from a moderately heavy sheet of stainless steel that combines sturdiness, stiffness and a limited amount of flexibility, carrier 15 is nearly rigid. Best seen in FIGURE 2, it is characterized by the flat washer-like portion 16, by a short cylindrical portion 17 which forms a shoulder of a size such as to accommodate gasket 11, by a relatively long frustoconical spacing portion 18 that extends inwardly at an angle of about 45 degrees, and by a reversely inclined lip 19. It is of one-piece construction, being former and shaped from flat stock.

Figures 2, 3, 4:
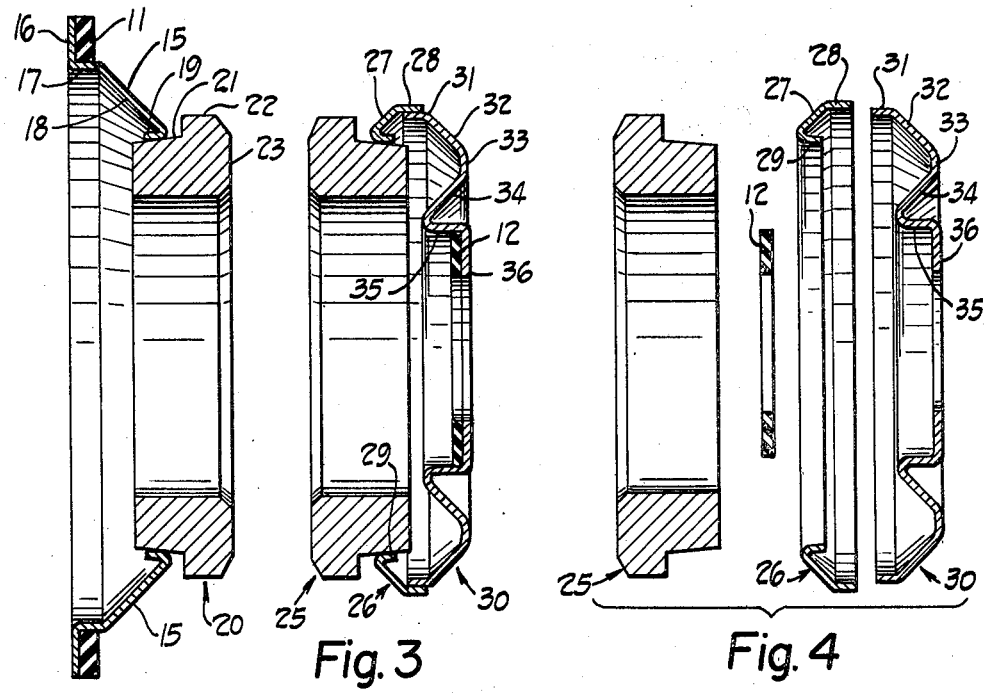
FIGURE 2 is an enlarged central section through the sub-assembly appearing in FIGURE 1 immediately to the left of the sealing unit.
FIGURE 3 is an enlarged central section through the sub-assembly appearing in FIGURE 1 immediately to the right of the sealing unit.
FIGURE 4 is an exploded view of the components making up the sub-assembly of FIGURE 3.

Seen in cross-section, as in FIGURE 2, lip 19 and frusto-conical spacing portion 18 define an angle slightly in excess of 45 degrees. Lip 19 departs from parallelism with the longitudinal axis of the sealing system by an angle which, for the sake of clarity, is shown in exaggerated fashion but which in practice is very small, normally about 3 degrees and less in any event than about 7½ degrees. Holding face 21 of seating element 20 likewise departs from parallelism with the longitudinal axis of the sealing system by a small angle of a magnitude of only a few degrees, usually about 3 degrees.

By forming lip 19 and holding face 21 in this way it becomes possible to attach carrier 15 to seating element 20 in very tenacious fashion. If, for example, the contacting surfaces are exact complements of each other, carrier 15 and seating element 20 will adhere so tenaciously as to require the use of a tool to separate them. Some other method of attaching carrier 15 to seating element 20 may be used if desired, but the method illustrated in FIGURES 1 and 2 is a particularly satisfactory one for the reason that, when necessary, it allows self-adjusting relative movement between carrier 15 and seating element 20.

As appears from FIGURE 2, seating element 20 is provided with a circumferential flange 22 extending outwardly beyond holding face 21. On the end remote from carrier 15, seating element 20 has a highly finished sealing face 23, preferably one that has been machined and lapped with a degree of accuracy within a few light bands. As a result of the presence of flange 22, sealing face 23 is relatively broad, permitting transverse movement between seating element 20 and the adjacent sealing ring 8a of sealing unit 8. See FIGURE 1.

In the drawings, seating element 20 is cross hatched to indicate that it is of metal, e.g., stainless steel. However, it may be of any other suitable material, including ceramic materials, comminuted compressed carbon, hard rubber, nylon, polytetrafluoroethylene ("Teflon") and the like. Although sealing ring 8a is stippled to indicate that it is of carbon, it may be of ceramic material, hard rubber, nylon, "Teflon" or any other suitable substance. Normally, sealing ring 8a and seating element 20 should not be of the same material, but excellent results can be obtained by using two dissimilar grades of carbon.

Rotatable sub-assembly 10, seen in FIGURES 1, 3 and 4, is comprised, apart from gasket 12, of an oppositely facing seating element 25 that is otherwise similar to seating element 20 and a two-piece unit consisting of a moderately flexible carrier 26 that is formed after the fashion of a circular channel with side and bottom walls 27, 28 and 29 and a largely inflexible, but not completely rigid, saucer-like spacer 30. Like carrier 15, carrier 26 and spacer 30 are of stainless spring metal, preferably stainless steel. The unit, taken as a whole, is more or less toroidal in shape, having some of the attributes of an incomplete torus. See FIGURES 3 and 4.

Carrier 26 and spacer 30 are shown in FIGURE 4 as separable; actually, they comprise a unitary structure, being welded together in the overlapping relation best seen in FIGURE 3. The unit so formed intervenes between seating element 25 and the impeller. It is clamped in place between the impeller hub and shoulder 13 on shaft 6. In this zone, which is annular in shape, spacer 30 is in physical contact with the impeller hub.

At the opposite end of the unit; i.e., that in contact with seating element 25, carrier 26 is in engagement with the holding surface of seating element 25. Side wall 29, which in FIGURE 3 extends to the right from inclined bottom wall 27, is angled to complement the holding face of seating element 25 and thus does not parallel cylindrical side wall 28; instead, it departs from literal parallelism by a few degrees, usually of the order of about three degrees. This provides the same type of tenacious adherence between seating member 25 and carrier 26 which has already been described in connection with the engagement between carrier 15 and seating element 20.

Spacer 30 has a peripheral cylindrical portion 31 that is held to cylindrical side wall 28 of carrier 26 by continuous resistance welding performed at a time when the contiguous surfaces are in overlapping relation, thus producing a fluid-tight joint. It also has a frusto-conical portion 32 extending toward the impeller hub at an angle of approximately 45 degrees to the longitudinal axis of the assembly as a whole. A flat portion 33, annular in shape, engages the impeller hub as shown in FIGURE 1. Having in mind what has already been said regarding the contact between the impeller and the spacer, there are therefore two radially spaced zones in which the spacer makes contact with the impeller, which makes for stiffness, stability and resistance to distortion.

Adjoining flat portion 33 is an internal or re-entrant flange-like member 34, 35 of triangular cross-section. Whereas the portion designated 34 is essentially frustoconical in shape, the portion designated 35 parallels the axis of shaft 6. Portion 35 is in engagement with shaft 6 just to the left of shoulder 13, seen as in FIGURE 1, but it extends to the right beyond shoulder 13 to an extent sufficient to permit of the intervention of gasket 12. Extending from member 34, 35 is a washer-like annulus 36 that is formed integrally with the remainder of spacer 30.

Preferably, the radii of curvature characterizing flange-like member 34, 35 and adjacent annuli 33 and 36 are large enough in magnitude to minimize or preclude stress corrosion in these areas.

If constructed in the manner described, sub-assemblies 9 and 10 will be found to be characterized not only by adequate transverse flexibility; i.e., limited freedom to move normally to shaft 6, but by appreciable resistance to axial displacement. Consequently, sealing unit 8 can "float" in the operation of the shaft-sealing system as a whole. By virtue thereof, the sealing unit tends to center itself in relation to the shaft, which is of course highly desirable.

When installing sub-assemblies 9 and 10, it is difficult for the intaller to distort the seating elements themselves. Ordinarily, distortion comes about when seating elements of the kinds commonly used in conventional sealing systems are drawn up too tightly by the mechanic by whom the installation is being made. Distortion of the seating element, when it occurs, keeps the sealing unit from operating at maximum efficiency. In the sealing systems of the present invention this is not a problem.

I claim:
1. An improved shaft sealing system for a machine such as a pump of the impeller type in which (1) the shaft is encompassed at its opposite ends by stationary and rotatable end members; (2) the shaft is surrounded in the space between such members by a sealing unit of the "floating" type; (3) that portion of the sealing unit which faces the stationary end member bears against a stationary seating element; (4) that portion of the seating unit which faces the rotatable end member bears against a rotatable seating element; and (5) said rotatable seating element is tenaciously engaged and carried by the adjacent end of a two-piece spring metal member of generally toroidal shape that bears against the rotatable end member in radially spaced zones.

2. Apparatus according to claim 1 wherein said two-piece spring metal member consists of an annular carrier and a saucer-like spacer which together tend to give said spring metal member its generally toroidal appearance.

3. Apparatus according to claim 2, wherein said saucer-like spacer has an internally flanged portion between two of said radially spaced zones.

4. Apparatus according to claim 3 wherein part of said internally flanged portion engages the shaft near the end adjacent the rotatable member.

5. A machine comprising a housing; a rotatable shaft projecting from the housing; stationary and rotatable end members encompassing the shaft at its inner and outer ends; a floating sealing unit surrounding the shaft between the two end members; a stationary seating element in the space between the stationary end member and the sealing unit, said stationary seating element engaging the sealing unit in sealing relation; a stationary carrier to which the stationary seating element is coupled; an oppositely directed rotatable seating element on the opposite side of the sealing unit; and, coupled thereto, a spring metal member of generally toroidal shape comprised of an internally flanged spacer and a carrier for the rotatable seating element.

References Cited

UNITED STATES PATENTS

| 3,244,868 | 8/1885 | Reilly | 277—90 X |
| 1,759,029 | 5/1930 | Wishart | 277—83 X |
| 2,014,932 | 9/1935 | Hallett | 277—90 X |
| 2,249,930 | 7/1941 | Bailey et al. | 277—42 |
| 2,692,787 | 10/1954 | Brummer | 277—89 X |
| 2,993,711 | 7/1961 | Peras | 277—65 X |
| 3,028,163 | 4/1962 | Heinrich | 277—63 |
| 3,203,704 | 8/1965 | Mueller | 277—90 X |
| 3,391,941 | 7/1968 | Donley | 277—63 |

FOREIGN PATENTS 124,325   3/1949   Sweden.

LAVERNE D. GEIGER, Primary Examiner

J. S. MEDNICK, Assistant Examiner

U.S. Cl. X.R.

277—65, 88

PO-1050
(5/69)

UNITED STATES PATENT OFFICE
CERTIFICATE OF CORRECTION

Patent No. 3,492,008      Dated January 27, 1970

Inventor(s) Philip F. Donley

It is certified that error appears in the above-identified patent and that said Letters Patent are hereby corrected as shown below:

Column 2, line 27, change "former" to --formed--.

Column 4, line 2, change "intaller" to --installer--;
lines 18 and 19, change "seating" to --sealing--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents